(12) United States Patent
Graef

(10) Patent No.: US 7,033,277 B1
(45) Date of Patent: Apr. 25, 2006

(54) UNIVERSAL JOINT

(75) Inventor: Jack H. Graef, Fallbrook, CA (US)

(73) Assignee: CTM Racing Products, Inc., San Juan Capistrano, CA (US)

( * ) Notice: Subject to any disclaimer, the term of this patent is extended or adjusted under 35 U.S.C. 154(b) by 44 days.

(21) Appl. No.: 10/385,205

(22) Filed: Mar. 7, 2003

Related U.S. Application Data

(60) Provisional application No. 60/363,056, filed on Mar. 8, 2002.

(51) Int. Cl.
*F16D 3/40* (2006.01)

(52) U.S. Cl. .......................... 464/11; 464/136
(58) Field of Classification Search .................. 464/11, 464/14, 132, 136
See application file for complete search history.

(56) References Cited

U.S. PATENT DOCUMENTS

| | | | | |
|---|---|---|---|---|
| 1,093,822 A | * | 4/1914 | Blum | 464/14 X |
| 1,108,567 A | * | 8/1914 | Fox | 464/132 |
| 1,556,467 A | * | 10/1925 | Abell | 464/11 X |
| 1,673,399 A | * | 6/1928 | Cutting | 464/14 |
| 1,926,858 A | * | 9/1933 | Peters | 464/14 X |
| 2,040,002 A | * | 5/1936 | Jones | 464/14 |
| 2,153,415 A | * | 4/1939 | Frederick et al. | 464/136 |
| 2,903,868 A | * | 9/1959 | Stillwagon, Jr. | 464/14 |
| 3,818,721 A | * | 6/1974 | Wahlmark | 464/132 X |
| 4,693,698 A | * | 9/1987 | Olson, II | 464/132 X |
| 4,808,144 A | * | 2/1989 | Orain | 464/132 X |
| 2002/0077183 A1 | * | 6/2002 | Sekine | 464/11 |

FOREIGN PATENT DOCUMENTS

| | | | | |
|---|---|---|---|---|
| GB | 691079 | * | 5/1953 | 464/14 |

* cited by examiner

*Primary Examiner*—Greg Binda
(74) *Attorney, Agent, or Firm*—Knobbe, Martens, Olson & Bear, LLP

(57) ABSTRACT

The universal joint features caps that allow the insertion of grease without removal of the caps. Inside each cap is a bushing that replaces the bearings used in other universal joints. One embodiment of the universal joint features a device for protecting a rubber o-ring which fits inside the caps and around the pins. Another aspect of the universal joint features an arrangement for cleaning the grease under the cap. Another aspect of the universal joint is a stronger material that can withstand more extreme driving conditions.

24 Claims, 4 Drawing Sheets

US 7,033,277 B1

UNIVERSAL JOINT

PRIORITY CLAIM

This application claims the benefit of U.S. Provisional Application No. 60/363,056 filed Mar. 8, 2002 entitled "Universal Joint."

FIELD OF THE INVENTION

The present invention relates to an improved universal joint for joining two shafts.

BACKGROUND OF THE INVENTION

Universal joints, also known as U-joints or Cardan joints, are used to couple two shafts and facilitate the transfer of force from one shaft to the next. Typically, each shaft will have a double yoke ending on the ends to be joined. A cross-shaped universal joint with four arms, or pins, connects the two shafts by placing one pin in each of the four yokes. This type of connection allows each shaft to rotate on an independent, and sometimes dynamic, axis.

Universal joints are found in industrial, military, and consumer applications. Typical products using universal joints include boats, cars, planes, generators, and other situations in which two shafts must be connected by a flexible joint. Common applications in vehicles include the drive-train and steering system. Often the forces transmitted with a universal joint are extremely large. Some of the most common applications in which universal joints are used in extreme conditions is four-wheel drive, off-road automobile driving and automobile and boat racing.

Four-wheel, off-road driving has become an increasingly popular pastime in recent years. Numerous clubs, magazines, and auto-part makers dedicate significant attention to the growing niche of extreme off-road driving. Many enthusiasts consider off-road driving the ultimate test of automotive engineering. Vehicles and components are literally driven to their breaking points in difficult driving conditions. Off-road driving applications include driving through small rivers, over large rocks, through sand, through mud, through snow, over fallen trees, and even over other cars, Four-wheel-drive vehicles are most common for these types of applications. Even most four-wheel-drive vehicles require significant modifications from the factory-produced models to handle treacherous off-road driving conditions.

Numerous companies produce after-market products designed to allow cars and trucks to handle off-road driving conditions. Typical products added to a vehicle to allow off-road driving include rugged tires, stronger axles, heavy-duty shock absorbers, gear differentials, and transfer cases. Even with the best modifications and the most skillful drivers, component failures are commonplace.

Universal joints are among the more common trouble-areas for off-road vehicles. In automotive applications, universal joints are used in a number of places and are particularly important for connecting a vehicle's drive shaft and axles. In such applications, the universal joints can be subjected to extreme forces as the connected shafts spin with high torque and high rpm.

When the universal joint leading to one particular axle fails, the force from the drive shaft can no longer be distributed that axle. Such a failure will render the associated tire immobile. When a vehicle suffers a universal joint failure, the vehicle will frequently need to be will towed to a repair facility. Furthermore, the types of repairs required after a vehicle suffers a universal joint failure generally need to be performed in a repair facility with sophisticated lifts and other equipment making such repairs very expensive. Moreover, failure of a universal joint often results in other problems such as broken axles or broken drive shafts.

SUMMARY OF THE INVENTION

The present invention is an improved universal joint that resists failure even under extremely harsh conditions. One aspect features a universal joint for use in off-road and/or racing vehicles with an improved design making the universal joint stronger and more suitable to harsh conditions than any other joint on the market today. Some embodiments employs improved material selections to increase the durability of the improved universal joint. Another feature includes a bronze bearings to reduce friction between the pins and the caps of the universal joint. Another feature describes a cap for a universal joint that has a grease injection point. Another feature describes a pin on a universal joint that has conduits through which grease can flow and be distributed around the pin and bearing. Another feature is a cap that allows the insertion of grease without removal of the cap or joint. Another feature is a method of injecting grease into the cap of a universal joint to lubricate the cap and to flush out dirt or other debris. Some embodiments feature replacement or after-market universal joints for connecting two shafts in an automobile and include a body with at least one clearance groove to facilitate installation, pins oriented in a cross shape with the body, a lubrication conduit, caps covering the pins, bushings to reduce friction between the caps and the pins as the pins and caps are free to rotate about one another, and a grease fitting that allows insertion of grease or other lubricants or cleaners inside the cap without removal of the cap.

DETAILED DESCRIPTION OF THE PREFERRED EMBODIMENT

Figure 1:
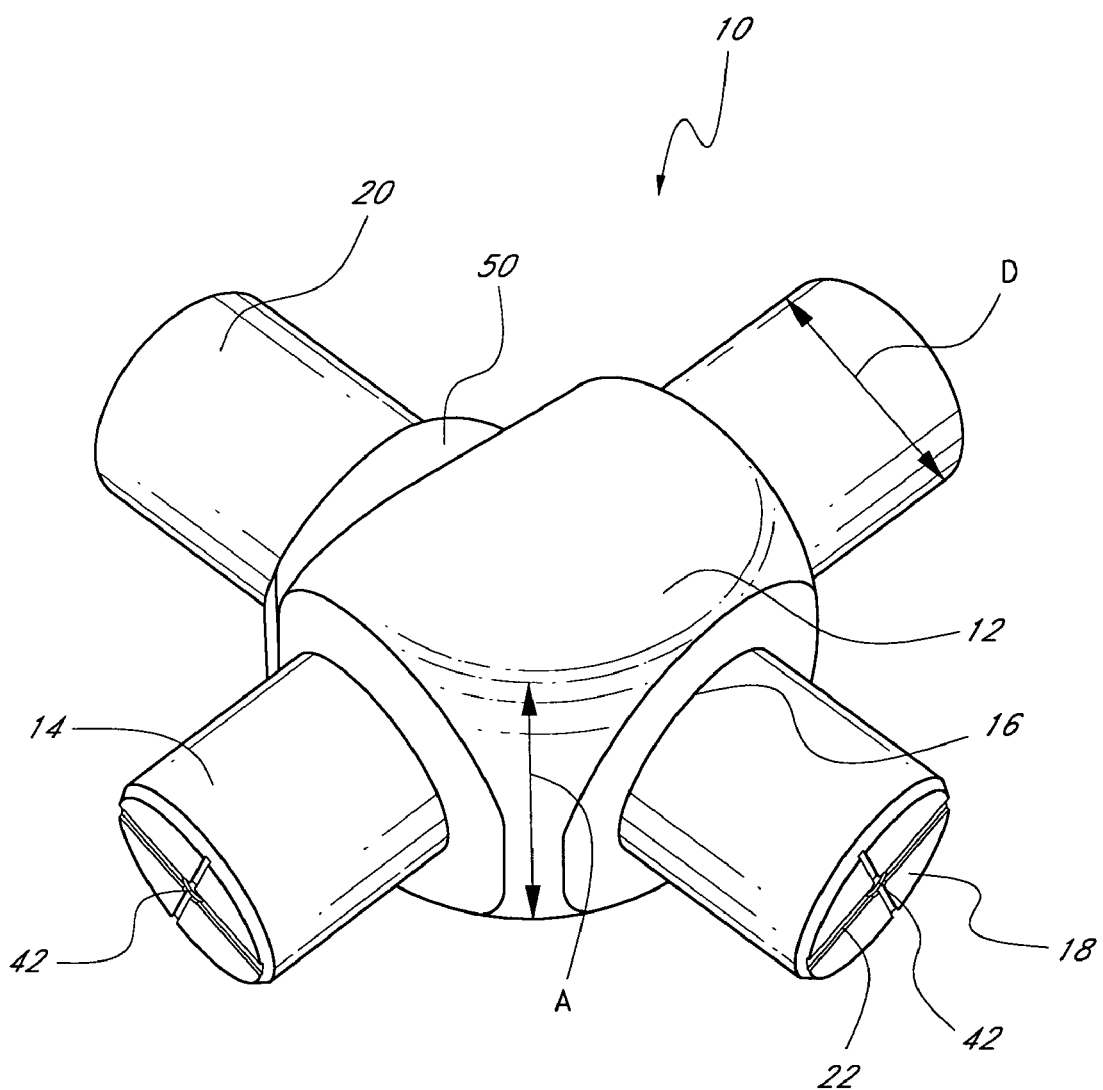
FIG. 1 is a perspective view of one embodiment of the present invention.

Shown in FIG. 1 is one embodiment of an improved universal joint 10 constructed in accordance with the invention. The joint 10 includes a body 12 and a plurality of pins 14. The joint 10 is designed for installation into the yokes of two shafts such as the various shafts used in an automobile's drivetrain. The joint 10 may be sold as an after-market product to replace original equipment manufacturer universal joints or it may be included as original equipment in applications where two shafts are joined.

Each pin 14 includes a first end 16, a second end 18, and an elongate surface 20. The elongate surface 20 is substantially smooth and cylindrical in shape. The first end 16 of each pin 14 communicates with the body 12, and the second end 18 of each pin 14 is spaced away from the body 12. In the embodiment depicted in FIG. 1, four pins 14 are oriented with the body 12 in a cross shape. The second end 18 optionally includes at least one conduit 22.

In some embodiments, the body 12 and pins 14 are formed from a single piece of material. For example, with some embodiments, the body 12 and pins 14 are milled from a single ingot. For other embodiments, the metal is cast in a joint shaped mold such that only the pins 14 need to be milled. In embodiments such as those depicted in FIG. 2, the pins 14' are removably secured to the body 12'. Any number of mechanical attachments may be used to secure the pins 14' to the body 12'. The pins 14' may be secured in the body with a retaining mechanism such as a ring clamp (not shown).

The body 12 has a thickness A and the pins 14 have a diameter D. The thickness A of the body 12 and the diameter D of the pins 14 vary depending on the application for which the joint is to be used. Universal joints are sized to match the yokes of the shafts which are to be joined, and, generally, larger shafts have larger yokes and require joints with greater thicknesses and greater diameters.

Figure 2:
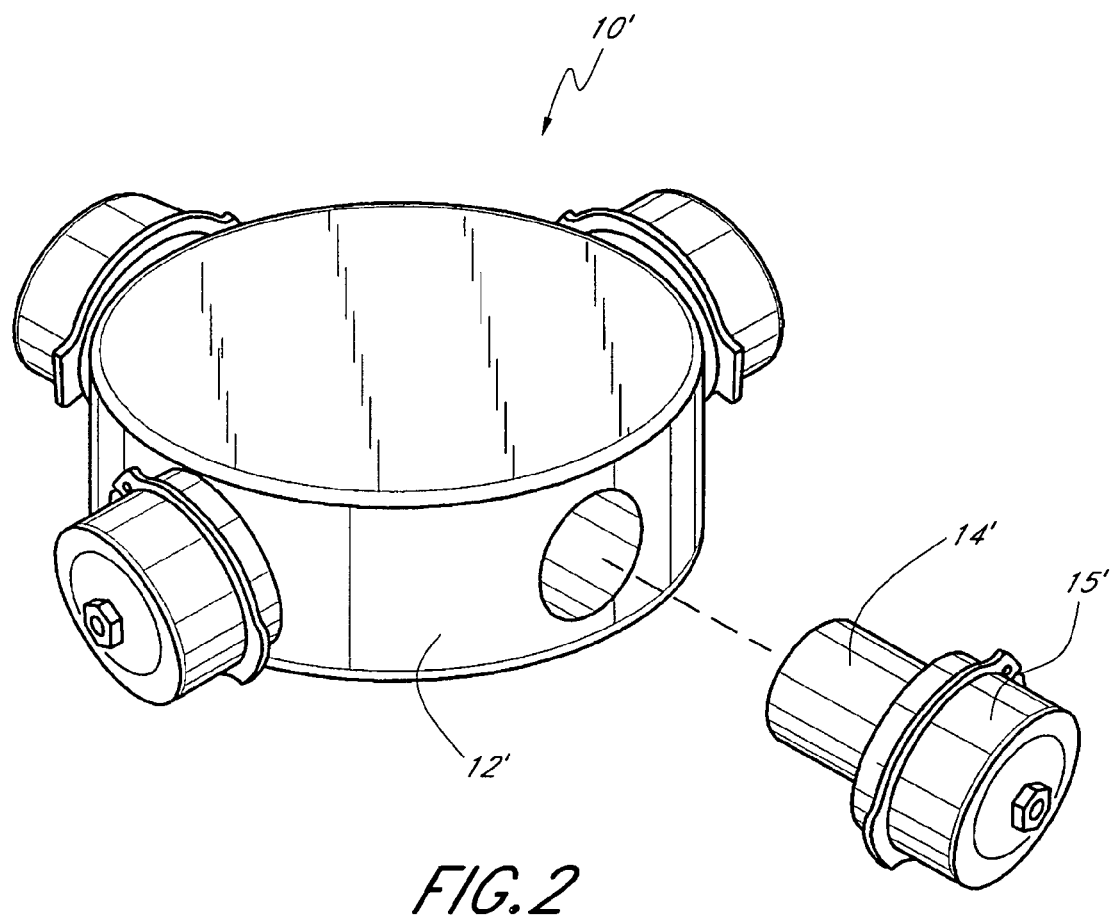
FIG. 2 is a perspective view of another embodiment of the universal joint of the present invention in which the pins are removable.
Figure 3:
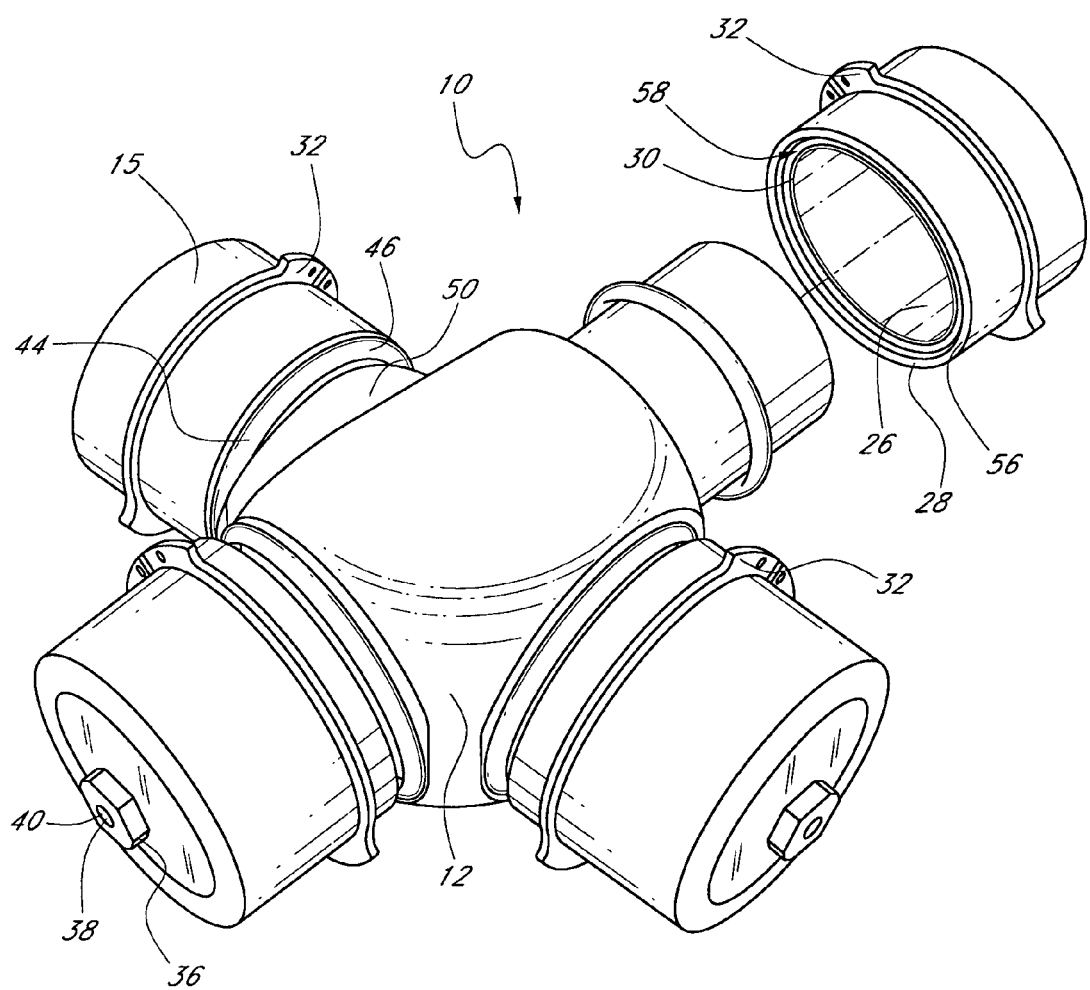
FIG. 3 is a perspective view of another embodiment of the universal joint showing the caps.
Figure 4:
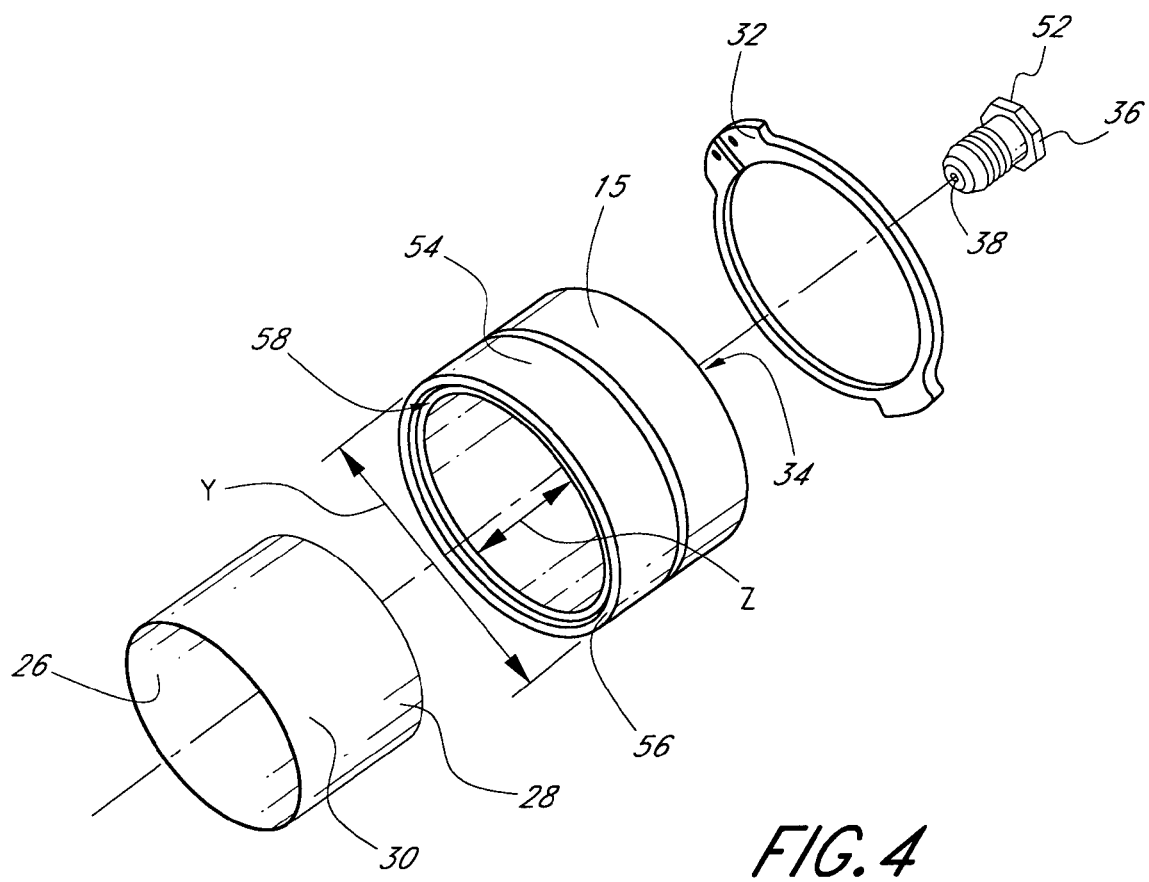
FIG. 4 is a perspective view of the caps of some embodiments of the present invention.

The joint 10 of the present invention may also include a plurality of caps 15, 15' as shown in FIGS. 2 and 3. The caps 15 include an open end and a closed end, and the caps are removably attached to the pins 14. An inner surface 26 of each cap 15 is substantially smooth and is designed to communicate with a pin 14. The inner surface 26 may include a friction reducing element 28 such as a bushing or bearings. In many embodiments, the inner surface 26 is a bronze bushing 30, as shown in FIG. 4. Some embodiments may include brass bushings. The inner diameter Z of the caps 15 is slightly larger than the diameter of the matching pin 14. A cap 15 and a matching pin 14 fit snugly together, but the cap 15 is free to rotate about the pin 14. Grease or other lubricants may be present between the cap 15 and pin 14.

Typically, one cap 15 is used for each pin 14. For example, FIG. 2 shows four caps 15 communicating with the four pins 14. As shown in FIG. 4, each cap 15 has an outer diameter Y and an inner diameter Z.

The thickness A of the body 12 and the diameter D of the pins 14 of the embodiment shown in FIG. 1 are greater than the thicknesses and diameters of comparable prior art universal joints. For example, one common type of axle used for automobiles has yokes with yoke hole diameters of 1.1875 inches. Prior art universal joints used with this type of axle have pin diameters of 0.767 inches and a body thickness of 0.954 inches. In contrast, the diameters D of the pins 14 which match axles with yoke hole diameters of 1.1875 inches are in the range of approximately 0.77 inches to 0.9 inches. More preferably, the pin diameters D matching this type of axle range from approximately 0.84 inches to 0.87 inches. More preferably, the pin diameter D for this type of axle is approximately 0.86 inches. In some arrangements, the pin diameter D can range from 0.8 inch to 0.9 inch and, in other arrangements, the pin diameter D can range from 0.7 inch to 0.9 inch. In one arrangement, the pins have a diameter of about 0.7 inch. The thickness A that matches this type of axle can range from approximately 1 inch to 1.5 inches. More preferably, the thickness A that matches this type of axle is approximately 1.312 inches. In some arrangements, the thickness A can range from 1 inch to 1.4 inches, in other arrangements, the thickness A can range from 1.1 inches to 1.5 inches and, in yet other arrangements, the thickness A can range from 1.15 inches to 1.4 inches. As explained in more detail below, installation can be more difficult with the increased thickness and clearance cut 50 is designed to facilitate installation.

As another example, another common type of axle has yokes with yoke hole diameters of 1.375 inches. Prior art universal joints used for this type of axle have pins with 0.893 inch diameters and a body thickness of 1.050 inches. The diameters D of the pins 14 which match axles with yoke hole diameters of 1.375 inches are in the range of approximately 0.96 inch to 1.1 inches. More preferably, the pin diameters D matching this axle range from approximately 0.97 inch to 1.05 inches. More preferably, the pin diameter D is approximately 0.98 inch. In some arrangements, the pin diameter D can range from 0.9 inch to 1 inch and, in other arrangements, the pin diameter D can range from 0.95 inch to 1 inch. In one arrangement, the pins have a diameter of 0.9 inch. In another arrangement, the pins have a diameter of 0.95 inch. The thickness A that matches this type of axle can range from approximately 1.1 inches to 1.35 inches. More preferably, the thickness A that matches this type of axle can range from approximately 1.2 inches to 1.3 inches. More preferably, the thickness A that matches this type of axle is approximately 1.25 inches. In some arrangements, the thickness A can range from 1 inch to 1.4 inches, in other arrangements, the thickness A can range from 1.1 inches to 1.5 inches and, in yet other arrangements, the thickness A can range from 1.15 inches to 1.4 inches.

In many embodiments, the ratio of the cap diameter Z to the pin diameter D is in the range of approximately 1.52:1 to 1.25:1. More preferably, the ratio of the cap diameter Z to the pin diameter D is in the range of approximately 1.5:1 to 1.3:1. Most preferably, the ratio of the cap diameter Z to the pin diameter D is in the range of approximately 1.4:1 to 1.35:1. In some embodiments, the cap outer diameter can be about 1.19 inches and, in other embodiments, the cap outer diameter can be about 1.38 inches.

Another novel feature of the joint 10 is the ability to rebuild the joint 10. Friction can cause the pins 14 and caps 15 to wear. In part because of the increased thickness of the pins 14, the pins can be milled to a smaller diameter and mated with a new cap 15 and/or a new bushing 30. The joint 10 can then be reinstalled. One method of rebuilding the universal joint 10 is to machine the pins 12 to a diameter that is 0.010 inch smaller then the original diameter. Some embodiments of the universal joints 10 include caps 15 with increased thicknesses or bushings 30 with an increased thickness to match the reduced thicknesses of the pins 14.

A retaining element 32 can be applied to hold the cap in place on the pin and inside the yoke. FIG. 3 shows a ring clip holding the cap in place. The yokes of an axle communicate with the caps 15 such that relative movement of the cap 15 within the yoke is substantially prevented. In some embodiments the caps 15 may be welded inside the yokes in addition to or in place of the retaining element 32. Embodiments that feature removable pins 14 may include a second retaining element.

As shown in FIG. 4, the caps 15 may also include an aperture 34. The aperture 34 allows the grease or other lubricants and cleaners to be injected to the inner surface 26 of the cap 15 without removing the cap 15 from the pin 14. FIG. 4 shows an embodiment in which a grease fitting 36 communicates with the aperture 34. The grease fitting 36 includes a port 38 through which grease, other lubricants, or other fluids may pass. A valve 40 inside the grease fitting 36 prevents grease from escaping from the port 38 and opens to allow grease into the cap 15 when grease is injected. Thus, grease can be inserted through the grease fitting 36, but grease typically cannot flow out of the grease fitting 36. In some embodiments, the grease fittings 36 feature a low profile head 52 that is designed to avoid interference with the movement of the yokes of a shaft. In some embodiments, the head 52 of the grease fitting 36 is machined to a smaller thickness to ensure that it will not contact the yokes of a shaft. In embodiments in which the pins 14 include conduits 22, the conduits 22 direct the flow of grease, other lubricants, and/or cleaning agents as needed to lubricate the inner surface 26 of a cap 15 and/or flush dirt, moisture, and debris away from the pin 14.

In some embodiments, the aperture 34 is drilled into the cap 15. The aperture 34 is then be tapped to receive a threaded grease fitting 36. The grease fitting 36 can then be screwed into place. In some embodiments, a fitting clearance 42 is drilled into the second end 18 of the pin 14, thereby preventing the grease fitting from reaching the pin.

Even with lubrication, friction between the caps 15 and/or bushings 30 and the pins 14 creates heat. Another novel aspect of the embodiment shown and described is the allowance for expansion of the metal pieces caused from this heat. A spacing device 44 such as an o-ring as shown in FIG. 3 aides in allowing this expansion. In some embodiments, the spacing device is a rubber o-ring 46. In some embodiments, the cap 15 includes a protective element 54 that covers the spacing device 44 and prevents rocks, sticks, or other debris from contacting the spacing device 44. Another embodiment of the invention shown in FIG. 4 presents a cap 15 in which a bottom edge 56 of the cap 15 is extended in length and has an o-ring groove 58 on its inside diameter. The o-ring groove 58 allows the o-ring 46 to fit inside the cap 15 so that the o-ring 46 is substantially protected from contact with foreign objects. Covering the o-ring 46 in this method helps to prevent damage to the o-ring 46 from sticks, rocks, and other debris that may otherwise come in contact with the o-ring 46.

Another novel feature of some embodiments of this invention is the ability to flush grease, dirt, moisture, and other debris from inside the cap 15 without removing the cap 15. Injecting sufficient quantities of new, clean grease through the aperture 34 allows old grease and debris to be flushed out of the cap 15.

Methods of installing the universal joint 10 are also disclosed herein. For embodiments of a universal joint which feature removable pins such as the one shown in FIG. 2, the body is first positioned between the yokes of one shaft and pins are inserted through the holes in the yokes. Next, the yokes of the second shaft are positioned such that the hole of the yokes line up with the pin holes 48 in the body 12 and the remaining pins are inserted. Any retaining elements are then added.

To install some other embodiments, the body 12 is first positioned within the yokes of one shaft. In embodiments with clearance cuts 50, the pin 14 nearest the clearance cut 50 is positioned inside one of the yokes. The joint 10 is then tilted such that the clearance cut 50 is moved toward the yoke. The additional clearance from the clearance cut 50 allows the body 12 to be positioned within the yokes and allows a second pin 14 on the opposite side of the body 12 to be inserted into the other yoke. This process is then repeated for the second set of yokes. With the joint 10 in position, one cap 15 is passed through each yoke and positioned over each pins 14. The caps 15 are then secured in place, for example, by welding them to the yokes or adding a retaining element 32. To remove the joint 10, the reverse procedure can be employed.

In one embodiment, the improved universal joint 10 are made of 4340 Mod 300M Chrome-Moly. The metal used in one embodiment has a hardness of 53 Rockwell C. Other materials could be used to make the universal joint 10. The bushings 30 in one embodiment are made of bronze.

For purposes of summarizing the invention, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

The drawings and the associated descriptions are provided to illustrate embodiments of the invention, and not to limit the scope of the invention.

The invention claimed is:

1. A universal joint for connecting two shafts in an automobile, said universal joint comprising:
    a body and four pins extending outward from said body, said four pins generally forming a cross shape;
    each pin comprising an elongate, generally cylindrical surface and a generally circular end surface, at least one conduit extending across a portion of said end surface, said conduit having an end that opens toward said elongate, generally cylindrical surface;
    four caps comprising an open end and a closed end;
    a bushing disposed between a portion of said elongate, generally cylindrical surface of a corresponding one of said pins and the corresponding cap;
    said caps being free to rotate about said pins with said bushings reducing friction between said caps and said pins;
    each cap comprising at least one grease fitting generally centrally located in said closed end of said cap;
    said grease fitting allowing insertion of a lubricant inside of each said cap without removal of said cap from said pin.

2. A universal joint comprising:
    a body;
    four pins extending outwardly from said body, said four pins generally forming a cross shape, each pin comprising a base portion connected to said body, an elongate, generally cylindrical surface, and a generally circular end surface oriented away from said body, and each pin including a grease fitting recess disposed on said generally circular end surface; and
    a cap positioned over a portion of each pin, each cap comprising an end wall having an outer surface and an inner surface, the end wall being juxtaposed to said end surface of said pin with the inner surface facing said end surface, each cap also comprising a grease injection fitting aligned with said grease fitting recess, said grease fitting recess providing additional clearance for said grease fitting, and each grease injection fitting communicating with a passage defined between said cap and said end surface.

3. The universal joint of claim 2 wherein said passage is defined in said end surface and extends radially toward said cylindrical surface.

4. The universal joint of claim 2 further comprising a bushing positioned between said cap and said pin.

5. A universal joint comprising:
    a body;
    four pins, each of said pins comprising a first end, a second end and an elongate generally cylindrical surface positioned between said first end and said second end, said first end being connected to said body and said second end being spaced from said body, said second end comprising a channel that is recessed into said second end and opening toward said elongate generally cylindrical surface, said four pins being oriented relative to each other to define a cross shape; and a cap associated with each of said four pins such that four caps are mounted to said universal joint;

a bushing disposed between a portion of said elongate generally cylindrical surface and the corresponding cap so as to reduce friction therebetween, each of the caps capable of rotation relative to said pins;

wherein each cap comprises an end wall, an inner cylindrical surface and an outer cylindrical surface, each cap also comprising a substantially open end, an inner diameter of said cap defined at said inner cylindrical surface being larger than an outer diameter of said pin defined at said elongate generally cylindrical surface, each cap comprising an aperture that extends through a central location of said end wall of said cap at a location proximate said channel that is recessed into said second end of said pin and a grease fitting connected to said aperture, said grease fitting allowing insertion of a lubricant inside of each said cap without removal of said cap from said pin.

6. The universal joint of claim 5, wherein said body and said pins are formed from a single piece of material.

7. The universal joint of claim 5, wherein said body is separately formed from at least one of said pins.

8. The universal joint of claim 7, wherein said at least one of said pins is removably connected to said body.

9. The universal joint of claim 8, wherein said at least one of said pins is secured to said body with a retaining mechanism.

10. The universal joint of claim 9, wherein said retaining mechanism comprises a ring clip.

11. The universal joint of claim 5, wherein said bushing is formed of a material selected from the group consisting of bronze and brass.

12. The universal joint of claim 5 further comprising a clearance cut defined in said body proximate said first end of one of said four pins, said clearance cut having a length that extends generally normal to an axis of rotation defined by said pin.

13. The universal joint of claim 5, wherein said grease fitting is positioned at least partially within said aperture that extends through said cap.

14. The universal joint of claim 13 further comprising a fitting clearance that is defined in said second end of said pin at a location corresponding to a location of said grease fitting in said cap.

15. The universal joint of claim 13, wherein said channel comprising a pair of radially extending channels.

16. The universal joint of claim 15 further comprising a fitting clearance that is defined at an intersection of said pair of radially extending channels.

17. The universal joint of claim 16, wherein said fitting clearance corresponds to a location of said grease fitting in said cap.

18. The universal joint of claim 5 further comprising a spacing device positioned between said cap and said pin.

19. The universal joint of claim 18, wherein said spacing device comprises a rubber o-ring.

20. The universal joint of claim 18, wherein said cap comprises a protective element that extends over said spacing device.

21. The universal joint of claim 20, wherein said protective element is an extension of a portion of said cap.

22. The universal joint of claim 21, wherein said portion of said cap is an edge that extends around said open end of said cap and that defines a spacing device groove.

23. The universal joint of claim 5, wherein said body comprises 4340 Mod 300M Chrome-Moly.

24. The universal joint of claim 5, wherein said body is formed of a material having a hardness of 53 Rockwell C.

* * * * *